United States Patent [19]
Fortune

[11] Patent Number: 5,804,795
[45] Date of Patent: Sep. 8, 1998

[54] SOLDERING TIP HEAT ACCUMULATOR

[76] Inventor: William S. Fortune, 29866 Cuthbert Rd., Malibu, Calif. 90265

[21] Appl. No.: 654,053

[22] Filed: May 28, 1996

[51] Int. Cl.⁶ .................................................... H05B 1/00
[52] U.S. Cl. ........................ 219/229; 219/227; 219/239; 228/51
[58] Field of Search ................................. 219/227, 229, 219/230, 231, 233, 237, 238, 239; 228/51, 55; 279/46.4

[56] References Cited

U.S. PATENT DOCUMENTS

| | | | |
|---|---|---|---|
| 2,708,117 | 5/1955 | Flory | 279/46.4 |
| 3,010,568 | 11/1961 | Annegarn | 279/46.4 |
| 3,495,844 | 2/1970 | Dee | 279/46.4 |
| 5,059,769 | 10/1991 | Fortune | 219/238 |
| 5,383,673 | 1/1995 | Mogilnicki | 279/46.4 |

FOREIGN PATENT DOCUMENTS 1-295704  11/1989  Japan ................................ 279/46.4

*Primary Examiner*—Tu B. Hoang
*Assistant Examiner*—Quan Nguyen
*Attorney, Agent, or Firm*—Daniel T. Anderson

[57] ABSTRACT

A soldering tip and heat accumulator therefor are disclosed in which the heat accumulator is essentially a hollow cylinder which is disposed over both a cylindrical heater and a major portion of the metal soldering tip. The accumulator is deeply slotted both from its rear and front ends whereby although before assembly it has radial clearance over both, when compressed during assembly by an outer retaining sleeve, the accumulator snugly engages both and provides a very high degree of thermal coupling between the heater and the soldering tip.

9 Claims, 4 Drawing Sheets

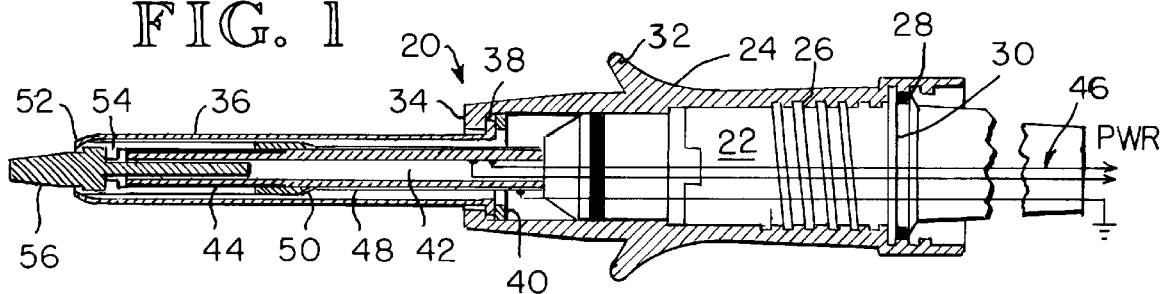
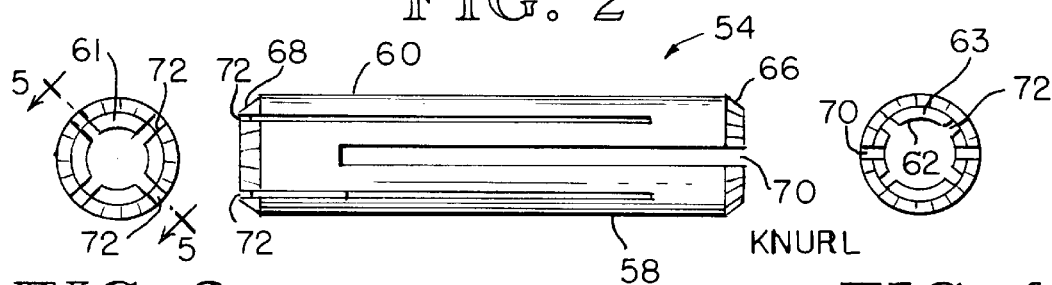
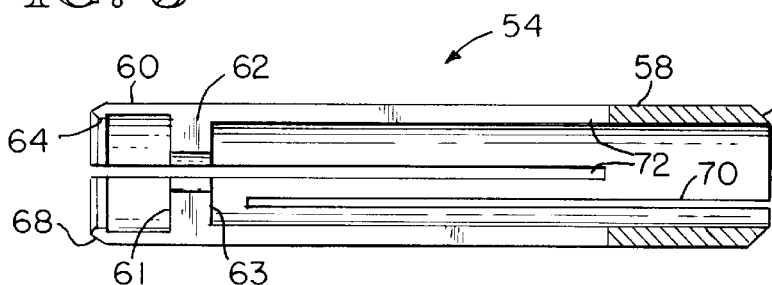
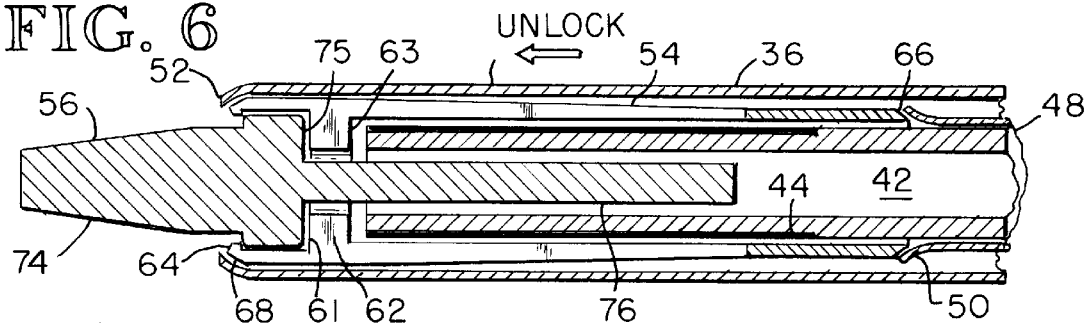
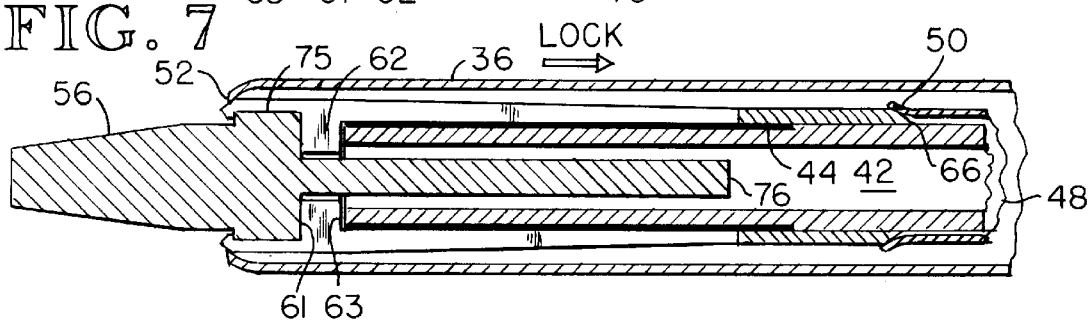

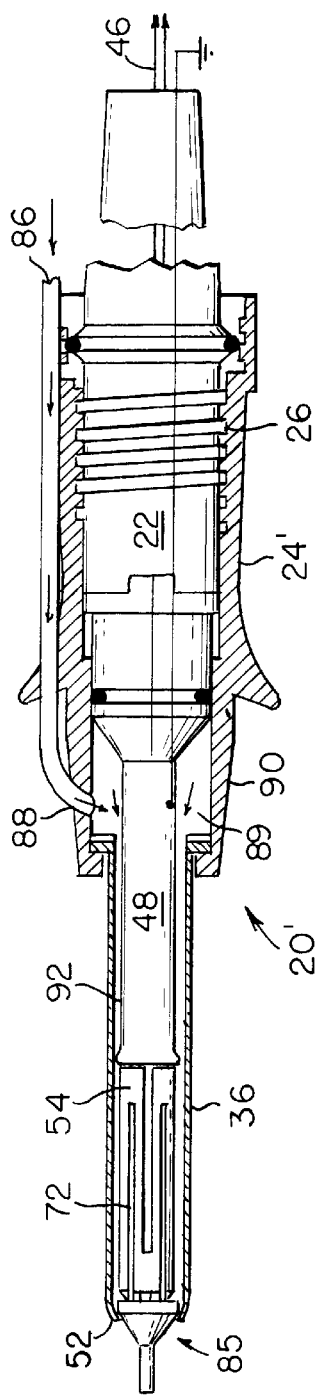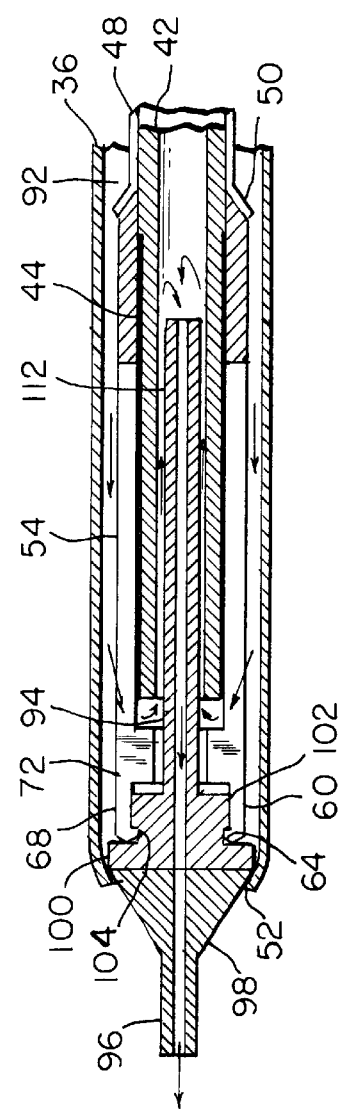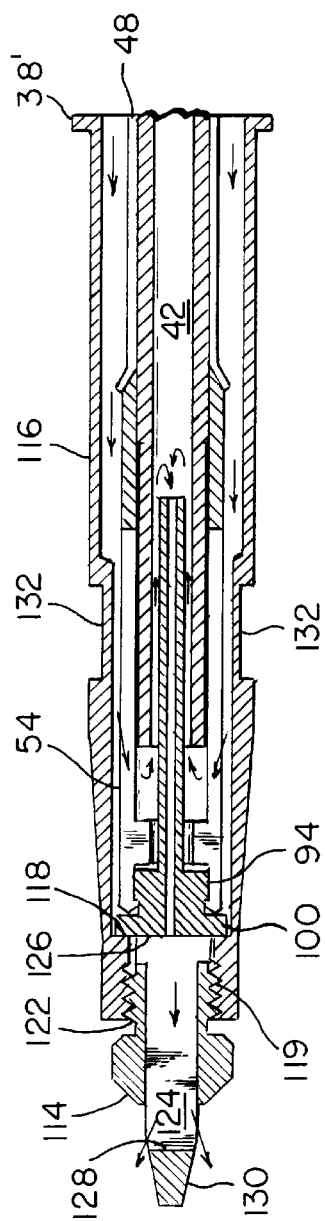
FIG. 13
FIG. 14
FIG. 15

SOLDERING TIP HEAT ACCUMULATOR

BACKGROUND OF THE INVENTION

This invention relates generally to electrically powered, hand held soldering, or desoldering, tools and more particularly to improvements in their heated tips which either contact the work piece or direct a flow of heated gas thereon. There term "hand held" is intended herein to include robotic applications and "gas" includes ambient air or inert or relatively inert gases such as carbon dioxide, nitrogen, or the like as when undesired, e.g. corrosive chemical action is to be minimized.

In the development of modern soldering instruments, many criteria have been exhaustively dealt with including a comfortable and safe handle, ease of operation, low cost to manufacture and maintain, easy parts replacement either for maintenance and repair or for versatility in optimizing its utility for specific, different operations, longevity of the working tip in its severe environment of oxidation and corrosive fumes, and precise temperature control of the working tip with power regulation to maintain a critically important temperature while providing the correct flow of energy to accomplish the soldering or desoldering of costly precision components typical of, for example, modern electronic or computer equipment.

The improvements described and claimed herein are directed primarily to this latter criterion; and their development and background is particularly treated in co-pending U.S. patent application, Ser. No. 424,161, filed Apr. 19, 1995, entitled SOLDERING TIP AND REMOVAL APPARATUS. Applicants prior patents: REPLACEABLE SOLDERING TIP ASSEMBLY—No. 5, 059, 769, HOT AIR SOLDERING AND RESOLDERING SYSTEM—No. 4, 419; 566, HOT AIR HEATED SOLDERING INSTRUMENT—No. 4, 926, 028, HOT GAS SOLDERING SYSTEM—No 5, 054, 106, and METALLIC CONDUCTION—HOT GAS SOLDERING-DESOLDERING SYSTEM—No. 5, 380, 982.

Although the improvements provided in these references constituted significant advances in the art of maximizing the thermal coupling between heater and soldering tip while minimizing the difficulties of removing and replacing the tip without damaging the delicate ceramic heater or injuring the operator of the soldering instrument, these coupling difficulties remained problem areas with less than desirable solutions.

It is an object of the present invention to provide a readily removable, replaceable soldering tip and heat accumulator therefor which are thermally highly effectively coupled to the heater element and which also promote a very sensitive temperature control of the working tip.

It is another object to provide a soldering tip heat accumulator which is mechanically and thermally very closely coupled to the heater element.

It is another object to provide, in combination with such soldering tip accumulators, removing apparatus for safely and comfortably removing the accumulator, even if seized to the heater, while not risking damage to the fragile ceramic heater or its temperature sensing element.

SUMMARY OF THE INVENTION

Briefly, these objects are achieved in a presently preferred example of the invention in which the soldering tip heat accumulator is of the character having an essentially hollow cylindrical body, with a reduced diameter accumulating shoulder disposed within its forward portion near its forward end and which fits over the front end of a cylindrical ceramic heater rod having a thermocouple temperature sensor disposed at its forward tip end and a deposited type of heater element disposed immediately rearwardly thereof. Rearwardly of the deposited heater a metallic sheath is disposed snugly over the ceramic rod and is terminated by an outwardly conically tapered forward end. The rear portion of the soldering tip accumulator is axially slotted along essentially its entire length and its rear is terminated by an inwardly conically tapered end such that when the tip is urged rearwardly over the ceramic rod the inwardly tapered end is retained by the outwardly tapered sheath end whereby the slotted rear end of the accumulator is pressed radially inwardly into a tight thermal coupling with the ceramic rod and its heater. When so disposed the reduced diameter accumulating shoulder is positioned against the forward end of the ceramic rod and its temperature sensor. The inner diameter of the cylindrical accumulator body is slightly larger than the ceramic rod so that a less than maximum thermal coupling exists between them except when the slotted skirt is forced radially inwardly against the rod and so that the tip may be removed and replaced without damaging the rod and its deposited heater.

The hollow cylindrical body includes a forward portion which extends forwardly of the inner accumulating shoulder and terminates in a reduced diameter inner, soldering tip retaining shoulder. This portion of the accumulator fits over an enlarged diameter portion of the body of a soldering tip, the enlarged diameter being approximately equal to the inner diameter of the forward position of the accumulator body. The enlarged diameter portion of the soldering tip is retained axially between the forward surface of the accumulating shoulder and the tip retaining shoulder of the accumulator. The tip is thereby thermally coupled to the accumulator by their joined cylindrical surfaces and by the abutment of the tip body against the forward surface of the accumulating shoulder.

A significant aspect of the invention is that the accumulator body is slotted through its cylindrical wall with two sets of slots: a set of rear slots extends from the rear end of the accumulator along most of its length to a point axially near the accumulating shoulder; and a set of forward slots, angularly separate from the rear set, extends from the forward end of the accumulator rearwardly through the accumulating shoulder and along the majority of the length of the accumulator body.

In a presently preferred example of the invention, the rear set is a pair of diametrically opposed slots; and the forward set is four symmetrically disposed slots angularly spaced from the he interspersed rear set.

When the soldering instrument is assembled for use, the accumulator is placed over the heater body with the rear, slotted, tapered end of the accumulator engaged within the tapered forward end of the heater rod sheath. A soldering tip may then be inserted within the hollow heater rod, within the rear portion of the accumulator, with the enlarged diameter portion of the tip disposed against the accumulator shoulder. An outer retaining sleeve carried by the handle body of the soldering instrument extends forwardly therefrom over the forward end of the accumulator and with a reduced inner diameter forward end engages the forward slotted end of the accumulator. The outer sleeve is then forcefully drawn rearwardly toward the handle body so that the tip and accumulator are compressed rearwardly for axial coupling to the heater and the slotted ends of the accumulator are compressed inwardly for radial coupling to the heater and the enlarged diameter portion of the soldering tip.

Further and detailed features of the invention are described and discussed below in connection with the drawings. For example, hot gas soldering apparatus embodiments and tip removal apparatus are shown in the drawings and described in the text wherein further objects and advantages of the invention are also set forth.

BRIEF DESCRIPTION OF THE DRAWINGS

FIG. 1 is a longitudinal sectional view of an example of a soldering instrument constructed in accordance with the principles of the invention;

FIG. 2 is side elevational view of the soldering tip heat accumulator of FIG. 1;

FIG. 3 is a front elevational view thereof;

FIG. 4 is a rear elevational view thereof;

FIG. 5 is longitudinal sectional view of the accumulator of FIG. 3 taken along the reference lines 5—5 thereof;

FIG. 6 is an enlarged longitudinal sectional view of the forward portions of the structure of FIG. 1 shown during assembly prior to the clamping drawback thereof;

FIG. 7 is a view like that of FIG. 6 after the clamping drawback of the structure;

FIG. 13 is a longitudinal view of a hot gas soldering instrument embodiment of the invention;

FIG. 14 is an enlarged sectional view of the forward portions of the structure of FIG. 13;

FIG. 15 is a view like that of FIG. 14 illustrating an alternative soldering tip and retainings means therefor;

DESCRIPTION OF A PREFERRED EMBODIMENT

Figure 8:
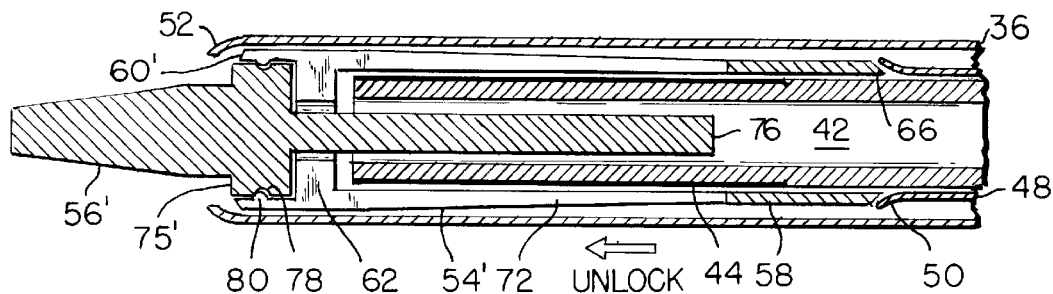
FIG. 8 is a view like that of FIG. 6 illustrating an alternative tip and retaining means.

In FIG. 1 an example of a soldering instrument 20 combintion of the invention is illustrated which includes a central body 22 and an outer handle portion 24 which is carried on the body 22 by a set of threads 26. This handle portion 24 fits over the front end of the body 22 and is threaded rearwardly over the threads 26. An o-ring 28 is disposed in a retaining groove 30 and frictionally damps any inadvertent tendency for the threads to loosen or otherwise be displaced from their desired mutual engagement. A particular aspect of their cooperation is described infra. The handle portion includes a finger guard collar 32 and a forward end, reduced diameter inner retaining shoulder 34. A forwardly extending retaining sleeve 36 having an enlarged diameter retaining shoulder 38 formed at its rear end is supported by the handle portion by engagement of the shoulders 34, 38 and a press-fit locking washer 40. The sleeve 36 extends forwardly over a heating rod assembly supported by the central body 22 and consisting of a ceramic heating rod 42 having a deposited resistive heater element 44 disposed over its forward end portion. Power to the heater element 44 is provided as schematically indicated by leads 46. Regulation of power to the heater element for temperature control is provided either 1) by the conventional technique of time sharing the power leads as resistance meter leads by zero-crossing switching of the AC power or 2) by a thermocouple sensing element, not shown, disposed on the ceramic rod 42 at its forward tip end and coupled by additional leads, not shown, to the power control circuit.

The base portion of the ceramic heating rod is supported by a metallic sheath 48 also carried by the central body 22 and terminating forwardly in a conically, diverging end 50 rearwardly of the deposited heater element 44.

The forward end of the retaining sleeve 36 is terminated in an inwardly converging, tapered shoulder 52; and, as shown, this shoulder when forced rearwardly by operation of the threads 26 drives a soldering tip heat accumulator 54 rearwardly against the diverging end 50 of the sheath 48. The same action compresses the accumulator 54 rearwardly against the heater element and a soldering tip 56 all as described in connection with subsequent figures.

In FIGS. 2, 3, 4 and 5 the construction of the particular example of the heat accumulator 54 is shown in enlarged detail as being essentially a hollow metallic cylinder divided axially into a rear, heater coupling portion 58 and a forward soldering tip coupling portion 60 by a reduced diameter accumulating shoulder 62 having a forward abutment 61 and a rear abutment 63. The forward end of the tip coupling portion is terminated by an inwardly directed retaining lip 64 for axially gripping the soldering tip 56. The rear end 66 of the accumulator 54 is conically tapered inwardly for cooperative engagement with the outwardly diverging end 50 of the heater sheath 48; and the forward end 68 of the accumulator is similarly tapered inwardly for cooperative engagement with the inwardly converging retaining shoulder 52 of the retaining sleeve 36. These tapered surfaces 66, 68 may be knurled as shown both to minimize deleterious seizing effects and to permit the flow of gases over these surfaces when assembled, as discussed infra.

The accumulator 54 is axially deeply slotted from both ends; and in this example the slotting is accomplished 1) from the rear end 66 by a set 70 of two diametrically approved slots and 2) from the front end 68 by a set 72 of four angularly symmetrically disposed slots evenly arranged with respect to the set 70 of rear slots.

From inspection it will be understood that the forward portion of the accumulator 54 provides a fulcrum or "hinge" for its segments formed by the rear slots 70 so that, when radially compressed by axial engagement of the end 66 into the tapered forward end 50 of the sheath 48, these segments are pressed into a snug mechanical and thermal coupling with the heater element 44. Similarly, the rear portion of the accumulator 54 provides a fulcrum or "hinge" for its segments formed by the forward slots 72 so that, when compressed by the forward lip 52 of the retaining sleeve 36, these segments are pressed into a snug mechanical and thermal coupling with the soldering tip 56. The thermal energy circuit may thus be considered to be from the deposited heater element 44, into the rear portion 58 of the accumulator 54, forwardly along its highly conductive length, and into the solder tip 56 for application to the workpiece, not shown.

With reference to FIGS. 6 and 7, the above described compressive assembly of the accumulator to the heater element and soldering tip are shown in detail. The soldering tip in this example is a figure of revolution about its longitudinal axis except for its spade-like working surface 74 disposed contiguously forwardly of an accumulating section 75 whose enlarged diameter is approximately equal to that of the inner diameter of the forward portion 60 of the accumulator 54 when that portion is radially compressed as shown in FIG. 7. A further accumulating portion 76 of the tip 56 extends rearwardly from the enlarged diameter section 75 through the center of the accumulating shoulder 62 and is disposed within the hollow ceramic heater rod substantially axially coincident with the deposited heating element 44. Thusly, a parallel thermal energy path from the heater element to the working surface 74 of the tip is provided.

In assembling the tip 56 and accumulator 54 into the soldering instrument 20, the accumulator is first placed over the forward, heater element portion of the ceramic rod 42 so that the end 66 is engaged within the tapered end 50 of the sheath 48 as shown in FIG. 6. The soldering tip 56 is then inserted into the accumulator with its enlarged diameter accumulating section 75 impressed against the forward surface 61 of the accumulating shoulder 62. When the retaining sleeve 36 is disposed forwardly, as shown in the FIG. 6, due to the relative unthreading of the threads 26 between the handle portion 24 and the central body 22 (see FIG. 1), the forward segments of the accumulator are spreadable to permit the large diameter section 75 to pass radially within the retaining lip 64 of the front end 68 of the accumulator. When, however, the threads 26 are operated to draw the sleeve 36 rearwardly to the position illustrated in FIG. 7, its tapered shoulder 52 engages the forward end 68 of the accumulator and forces it radially inwardly to compress its forward segments into a snug, retaining contact with the accumulator section 75. The same action of the sleeve 36, caused by on-threading of the threads 26, forces the rear surface 63 of the section 75 into contact with the front end of the heater rod 42. Finally to be understood is that the compressive engagement of the lip 52 over the front end 68 of the accumulator segments locks the tip in place because the lip 64 of the accumulator 54 is held inwardly by its engagement with the lip 52.

Figure 9:
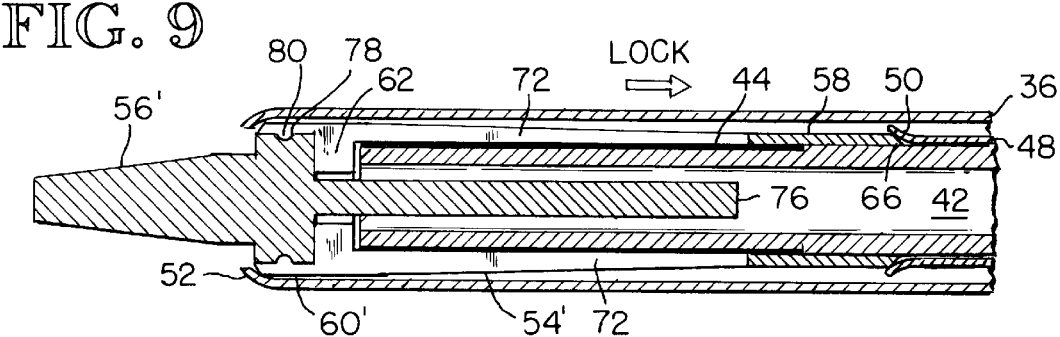
FIG. 9 is a view like that of FIG. 7 showing the structure of FIG. 8.

In FIGS. 8 and 9 an alternative arrangement of the tip looking feature is illustrated in which the accumulating, enlarged diameter portion 75 of the tip 56 is formed with an annular retaining channel 78 disposed about its mid-portion. A mating retaining shoulder 80 is provided on the inner surface of the forward portion 60 of the accumulator 54; the tip and accumulator and retaining sleeve 36 and their cooperation, both thermally and mechanically, being otherwise like the corresponding structure described supra. Again, it will be clear by inspection that the accumulator 54' and tip 56' may be assembled as shown in FIG. 8 with the sleeve 36 in its forward, unlocked position. Then the sleeve may be drawn rearwardly by operation of the threads 26 (see FIG. 1) to lock the tip and accumulator in place.

Figure 10:
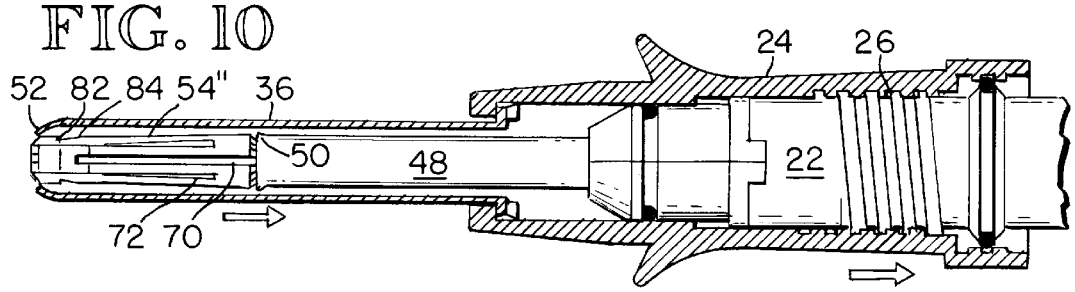
FIG. 10, 11 and 12 are sectional views with some parts in elevation, illustrating an alternative example of the invention including its tip removal features.
Figure 11:
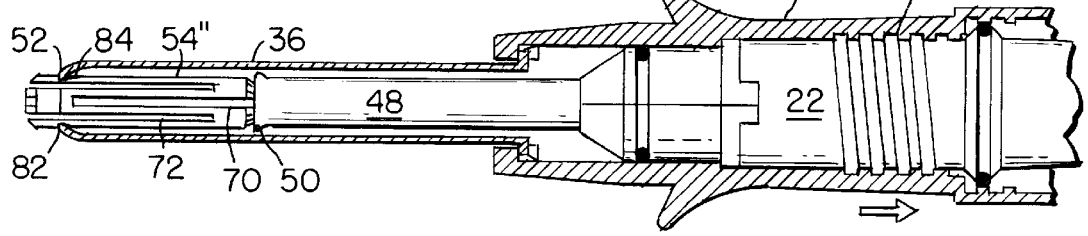
Figure 12:
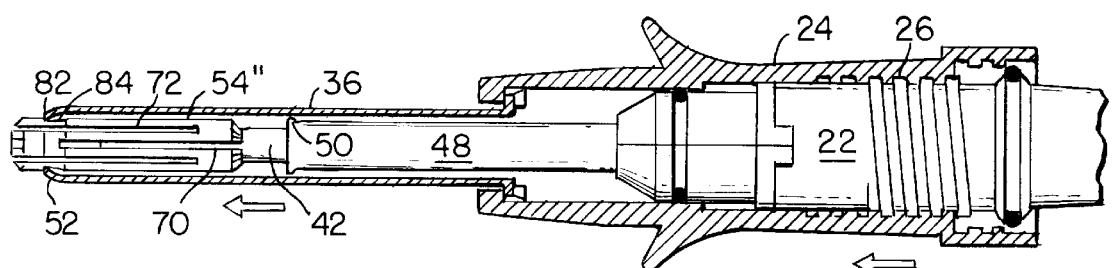

In FIGS. 10, 11, and 12 an example of the invention is shown featuring apparatus and technique for removing an accumulator 54" from its engagement with the ceramic heating rod 42 to which it may have become seized, especially during extended high temperature use.

In this example all the structure of the soldering instrument may be considered to be identical with that of the previous figures except that the soldering tip is not shown; and a detail on the outer surface of the forward portion of the accumulator is different. Accordingly, a detailed description of the structure in common is, for simplicity, deleted.

The accumulator 54" is, in this example, provided with a rear facing radial; annular step 82 with a tapered transition 84 back to the basic outer diameter of the hollow cylindrical accumulator body. This step does not in any way affect the retaining and locking features described supra. When, however, the tip has been unlocked and removed, as indicated in these figures, the threads 26 may be operated further "on" until the lip or inner shoulder 52 on the front of the sleeve 36 engages the step 82 as in FIG. 11. The threading of the threads 26 may then be reversed to push the accumulator 54" forwardly as shown in FIG. 12 until it is free from its capture within the tapered end 50 of the heater rod sheath 48 and all its segments between the slots 70, 72 have radially expanded to be clear of the surface of the ceramic rod 42. The accumulator may then be dropped out or plucked from the front of the sleeve 36. Note from FIG. 11 that the threads 26 are maximally engaged to draw the handle portion 24 and, thereby, the sleeve 36 fully rearwardly while in FIG. 12 the threads 26 are relatively disengaged to push the accumulator forwardly as shown.

In FIGS. 13 and 14 an example of the invention adapted particularly to hot gas soldering is illustrated. The soldering instrument 20, for simplicity, may be considered to be substantially identical to the instrument 20 of FIG. 1 except for a different, hot gas tip assembly 85 and the provision of a gas supply tube 86 supported along the length of the handle portion 24 and ducted terminally through a port 88 into a plenum 89 formed by the interior of the front end 90 of the handle portion. In operation, gas under pressure is fed into the plenum 89 through the tube 86 from whence it flows forwardly along the annular space 92 between the heater rod sheath 48 and the sleeve 36, over the outer surfaces of the heat accumulator 54, and then inwardly through the slots 72. Referring to the sectional FIG. 14, the further route of the gas as it is heated and directed forwardly toward a workpiece is shown in somewhat enlarged detail. The gas, indicated by flow arrows in these figures, flows forwardly from the annular space between the sleeve 36 and the accumulator 54, inwardly through the forward portions of the slots 72, over the end of the heater rod 42, rearwardly between the heater rod and a heat collector tube 94, inwardly over the rear end of the tube 94, forwardly through the length of the collector tube, and finally through the central nozzle bore 96 of a hot gas soldering tip 98.

The heat collector tube in this example includes an enlarged diameter body portion 100 whose diameter is greater than the inner diameter of the forward retaining edge 52 of the sleeve 36. Contiguously rearwardly of the body portion 100 is disposed a reduced diameter portion 102 whose diameter is approximately equal the inner diameter of the forward portion 60 of the accumulator 54 and whose axial length is approximately equal to that of the portion 60. At the forward end of the portion 102, a retaining groove 104 is provided which mates, when assembled, with the retaining lip 64 at the forward end 68 of the accumulator 54. The hot gas soldering tip 98 is disposed in abutment forwardly of the heat collector tube 94 and has, in this example, a base in the form of a truncated cone with the outlet nozzle 96 extending forwardly therefrom and being centrally bored to form the bore 96 in register axially with the bore 112 through the collector tube 94.

The diameter of the base of the truncated conical tip 98 is, like the portion 100 of the heat collector tube 94, larger than the forward end 52 of the sleeve 36. Accordingly, these items are inserted into the sleeve from its rear by totally unscrewing the threads 26 and removing the handle portion 24 from its central body 22. The accumulator may be affixed to the collector tube at that time or left on the heater rod 42 and forced over the reduced diameter portion 102 as the forward segments of the accumulator are spread by the lip 64 until it slips into its retaining groove 104 on the heat collector tube body as shown in FIG. 14. It should be noted that the tip and nozzle 98, 96 and the heat collector tube 94 may be formed in a single solid piece; however, in practice it has been found that the tube 94 may be generic to many different shapes and sizes of soldering tips as illustrated in the subsequent figures. Furthermore, the tips are vulnerable to wear and deterioration and necessary periodic replacement while the collector tube may be an essentially permanent part.

In FIG. 15 an example of the invention is illustrated in which the accumulator 54, heater rod 42, sheath 48, and heat collector tube 94 are the same as above but embodying a different hot gas tip 114 and outer retaining sleeve 116. In this example the sleeve 116 includes a rear enlarged diameter retaining shoulder 38' which affixes to the instrument body as discussed supra in the previously described examples. The sleeve 116 extends forwardly over the heater rod 42, sheath 48, accumulator 54, and heat collector tube 94 and is provided with a reduced diameter retaining shoulder 118 which abuts the front surface of the heat collector tube portion 100 and retains the assembly while urging, by the operation of the threads 26, the heat collector tube and accumulator into a good compressive thermal coupling. Forwardly of the retaining shoulder a set of tip retaining, internal threads 119 are provided for removeably carrying a hot gas tip 120 having mating external threads 122. The tip 120 of this example is generally of the character to be heated by the hot gas and to provide solder melting energy to the workpiece by metal-to-metal contact. To such end, the tip 120 is provided with a longitudinally central slot 124 extending forwardly from its rear end 126 to a point 128 just rearward of the working tip 130. After the hot gas flows along the slot 124 and impinges upon the rear of the working tip 130, it is exhausted forwardly over the workpiece for general heating or preheating of the area, for fume dispersal, and, when an inert gas is used, for providing a non-corrosive environment for the soldering or desoldering operation. Note that a pair of "flats" 132 are provided for a wrench tool to react torsional forces exerted on the instrument when tips such as the tip 120 are screwed on or off—especially when some seizing in the threads 119, 122 has occurred.

Figure 16:
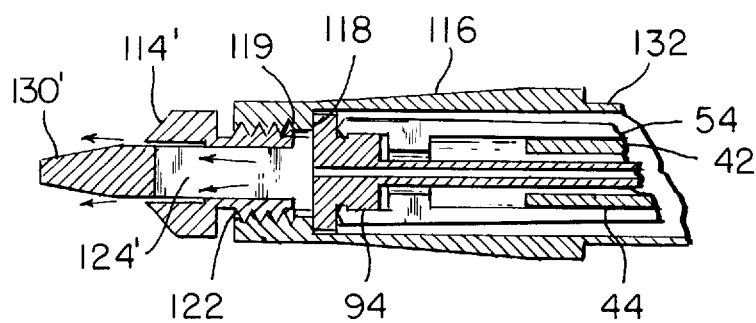
FIG. 16 is a view like that of FIG. 15 illustrating another example of the soldering tip and retainer of the invention.

In FIG. 16, the structure of FIG. 15 is repeated except that the slot 124' in the tip 114' is shorter and formed to direct the exhaust hot gas in a more focused stream forwardly onto a workpiece.

Figure 17:
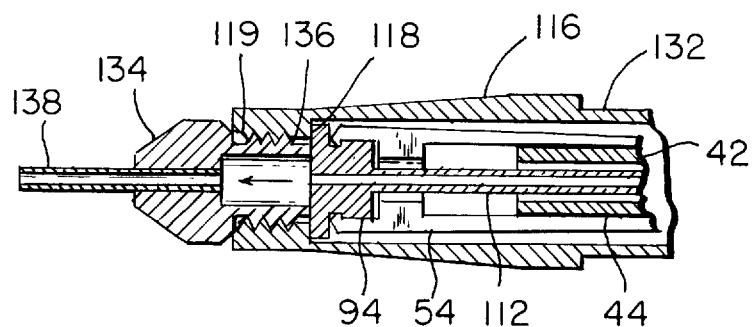
FIG. 17 is an illustration of yet a further example of a hot gas tip of the invention.

In FIG. 17, the structure of FIG. 15 is again repeated except that the tip is of the character to provide a jet of hot gas directly to the workpiece (as with the structure of FIG. 13) while utilizing the threaded retaining character of the sleeve 116. Thus a tip 134 is provided with a threaded body 136 to screw into the threads 119 of the sleeve 116. Projecting forwardly from the body 136 is a nozzle 138 aligned in register with the bore 112 of the collector tube 94; and in operation, the pressurized gas is heated and is caused to flow as described supra and is directed through the nozzle 138 for application to the workpiece.

There have thus been disclosed and described a number of examples of the invention illustrating the presently best known apparatus and methods for utilizing the principles and advantages of the invention as claimed herein below.

I claim:

1. A soldering tip heat accumulator comprising:
   a substantially hollow cylindrical metallic body having a rear heater engagement portion and a forward soldering tip engagement portion, said portions being defined by and axially separated by a reduced diameter accumulating portion having a forward planar shoulder intended for disposition contiguously to a heater,
   said rear heater engagement portion being terminated at its rear end by an inwardly conically tapered edge,
   said forward tip engagement portion having an inwardly directed locking retaining shoulder disposed axially between its forward end and said forward planar shoulder for engaging positively the outer surface of a working soldering tip,
   said hollow cylindrical body being formed with a first set of longitudinal slots extending through its said forward end to a point rearward of said accumulating portion and a second set of longitudinal slots extending through its said rear end to a point contiguous to said accumulating portion.

2. A soldering tip heat accumulator as set forth in claim 1 which said retaining shoulder of said forward, tip engagement portion is a retaining lip disposed at the front end thereof.

3. A soldering tip heat accumulator as set forth in claim 1 in which said front end of said forward, tip engagement portion is terminated in a conically inwardly tapered edge.

4. A soldering tip heat accumulator as set forth in claim 3 in which the conical surface of each of said tapered ends is knurled.

5. A soldering tip heat accumulator is set forth in claim 1 in which said first and second sets of slots are angularly interleaved in substantially symmetrical patterns.

6. A soldering tip heat accumulator as set forth in claim 5 in which said first set of slots comprises at least three slots and said second set comprises at least two slots.

7. A soldering tip and soldering tip heat accumulator comprising:
   a substantially hollow cylindrical metallic body having a rear, heater engagement portion and a forward soldering tip engagement portion, said portions being defined by and axially separated by a reduced diameter accumulating portion having a forward planar shoulder for disposition contiguously to said heater,
   said rear heater engagement portion being terminated at its rear end by an inwardly conically tapered edge,
   said forward tip engagement portion having an inwardly directed locking retaining shoulder disposed axially between its forward end and said forward planar shoulder for engaging positively the outer surface of a working soldering tip,
   said hollow cylindrical body being formed with a first set of longitudinal slots extending through its said forward end to a point rearward of said accumulating portion and a second set of longitudinal slots extending through its said rear end to a point contiguous to said accumulating portion; and
   a soldering tip having a forward heat application portion followed rearwardly by an enlarged diameter body portion the diameter of which is substantially equal to the inner diameter of said forward, soldering tip engagement portion and whose axial length is substantially equal to that of said tip engagement portion.

8. The combination as set forth in claim 7 in which said inwardly directed retaining shoulder is a forward lip retentively engaging the forward end of said enlarged diameter body portion of said soldering tip.

9. The combination as set forth in claim 7 in which said enlarged diameter body portion of said soldering tip is formed with a retaining channel disposed about its midportion and in which said retaining shoulder of said forward tip engagement axially disposed thereby axially retaining said soldering tip therein.

\* \* \* \* \*